(No Model.) 2 Sheets—Sheet 1.
J. M. MITCHELL.
WIND APPARATUS FOR GENERATING ELECTRICITY AND CHARGING SECONDARY BATTERIES.
No. 457,657. Patented Aug. 11, 1891.
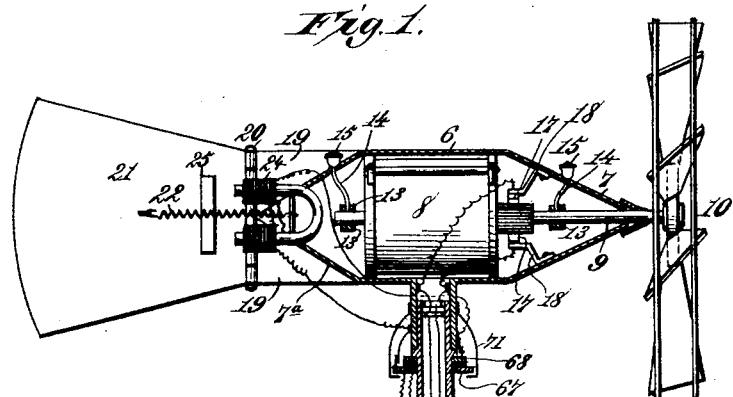
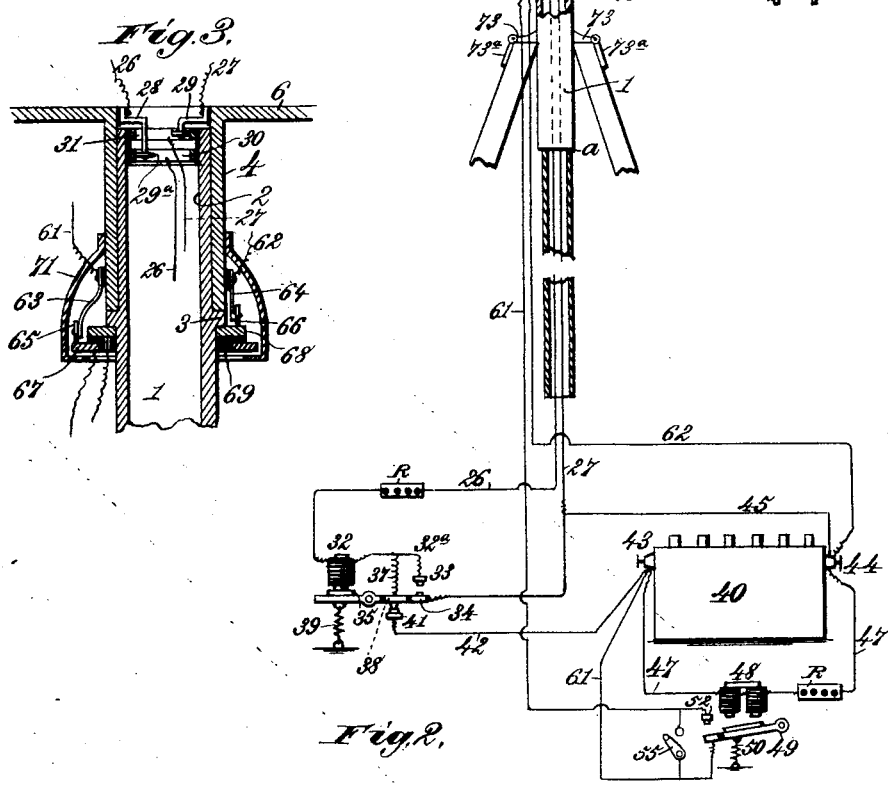
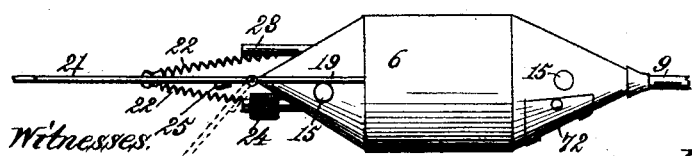
Witnesses.
Inventor:
James M. Mitchell.
By James L. Norris.
Atty.

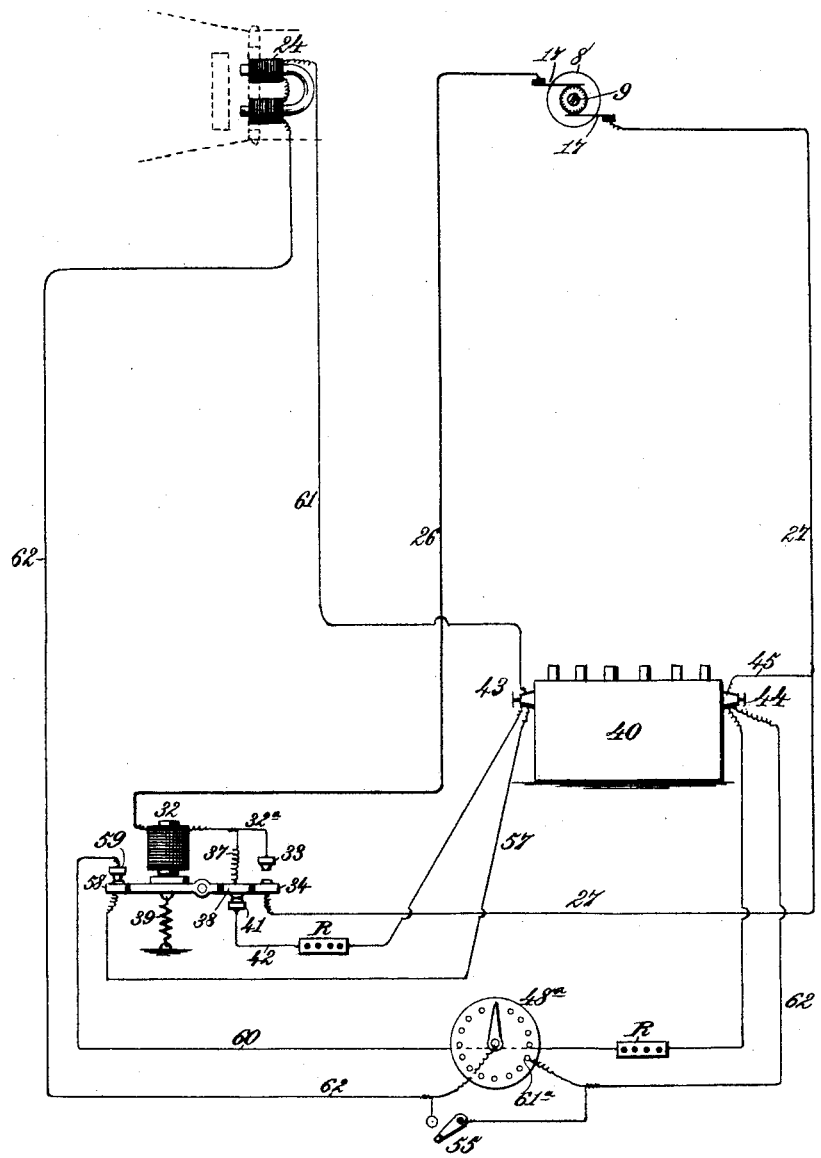

UNITED STATES PATENT OFFICE.

JAMES MADISON MITCHELL, OF LAWRENCEVILLE, ASSIGNOR OF ONE-HALF TO WILLIAM A. CAMP, OF GREEN WAY, GEORGIA.

WIND APPARATUS FOR GENERATING ELECTRICITY AND CHARGING SECONDARY BATTERIES.

SPECIFICATION forming part of Letters Patent No. 457,657, dated August 11, 1891.

Application filed March 23, 1891. Serial No. 386,121. (No model.)

*To all whom it may concern:*

Be it known that I, JAMES MADISON MITCHELL, a citizen of the United States, residing at Lawrenceville, in the county of Gwinnett and State of Georgia, have invented new and useful Improvements in Wind Apparatus for Generating Electricity and Charging Secondary Batteries, of which the following is a specification.

This invention relates to apparatus whereby wind-power may be applied to operate a dynamo-electric machine for the purpose of generating a current which may be utilized in charging a secondary or storage battery to supply lighting, motor, and other circuits.

It is my purpose to provide an apparatus which will be simple and comparatively inexpensive, and by which the generating circuit shall be automatically opened whenever the secondary battery shall have been charged to its full capacity, or to a previously-determined point.

The invention consists in the several novel features of construction and new combinations of parts hereinafter fully described, and then particularly pointed out in the claims which follow this specification.

To enable others skilled in the art to understand and practice my invention, I will describe the same in detail, reference being had to the accompanying drawings, in which—

Figure 1 is an elevation, partly in section, showing my invention. Fig. 2 is a plan view of the casing or housing inclosing the dynamo-machine, together with the vane of said housing. Fig. 3 is a central section showing the upper part of the windmill or wind-wheel support, drawn upon an enlarged scale. Fig. 4 is a diagram showing a slightly-different arrangement of circuits.

In the said drawings, the reference-numeral 1 indicates a tubular upright of any suitable altitude arranged in a situation where it is exposed to the action of the wind. At the upper open end of the upright 1 is formed a bearing or cylindrical portion 2, having a collar 3 at its lower end, which is some distance below the open top of the upright. Upon this cylindrical bearing is mounted a socket 4, its lower end resting on the collar 3 and its upper end rising somewhat above the top of the upright. Upon this tubular socket is securely mounted a housing or casing 6 of substantially cylindrical form, though not necessarily so, and provided with conoidal ends 7 and 7$^a$. Within the cylindrical housing 6 is arranged a dynamo-electric machine 8, the commutator and armature thereof being mounted upon a shaft 9, which is supported in bearings 13, lubricated by pipes 14, which pass through the conoidal end of the walls of the housing, and are provided with oil-cups 15. One end of the shaft 9 projects through the conical point or apex of one of the ends 7, and upon its outward portion is mounted a wind-wheel 10 of any preferred construction. Upon the other end 7$^a$ are formed or mounted an upper and a lower vertical fin or plate 19, to which a vane or blade 21 is connected by means of a hinge-joint 20, which is normally held in substantially the same central and vertical plane with the fins 19 by springs 22. Upon one side of the rearward extremity 7$^a$ is arranged a stop 23 to limit the movement of the vane 21, and upon the opposite side is placed an electro-magnet 24, the armature 25 of said magnet being attached to the adjacent face of the vane or blade 21 in such manner that it will face the poles of said magnet when the vane is turned into the position shown by dotted lines in Fig. 2. The brushes 17 of the dynamo are supported by brackets 18, bolted to the wall of the conoidal end 7.

From the upper and lower brushes of the dynamo wires 26 and 27 respectively are led to the brackets 28 and 29, mounted upon the end of the socket-piece 4, and preferably just within its open upper end. These brackets are of conducting metal and extend inward and then downward to different points, the bracket 28 having a rolling contact 29$^a$, which travels upon a ring 30, mounted on an insulating-surface upon the inner face of the tubular support, a little below its open upper end. The bracket 29 has a like construction, but does not drop so low, its rolling contact moving upon a separate ring 31, above the ring 30 and upon the same insulating-surface. From the lower ring 30 a continuation of the wire 26 is carried down within the tubular upright to an opening suitably situated, from which it emerges and is led to one terminal of the coil of an electro-magnet 32. From the other terminal of said coil a wire 32ª is carried to a rigid contact 33, arranged above the insulated rear end 34 of an armature 35, pivoted beneath the magnet at such a point that when a sufficient current flows through the coil of said magnet it will attract that portion 35 of the armature on the other side of its pivotal support, thereby dropping the rear portion 34. To the wire 32ª is connected a branch 37, secured to a separate insulated part 38 of the armature in rear of its pivotal point. The wire 27 from the lower brush of the dynamo is led to the bracket 29, and a continuation of said wire passed from the ring 31 down the interior of the tubular upright and out through its opening, its end being permanently attached to the insulated end 34 of the armature. A spring 39 of proper tension draws the end 35 of the armature away from the pole of the magnet 32 when the attraction of the latter is overcome by said spring, thereby bringing its insulated extremity 34 against the contact 33 and completing the circuit of the dynamo through the wire 26, electro-magnet 32, wire 32ª, insulated end 34, and wire 27.

The numeral 40 indicates a storage-battery of any known type. From a fixed contact 41, arranged beneath the insulated portion 38 of the armature, with which it is brought into electrical contact as the armature is lifted by the magnet 32, a wire 42 is led to one pole 43 of said storage-battery, and from the other pole 44 of said battery a branch wire 45 unites with the wire 27.

From a binding-post electrically connected to the pole 43 of the storage-battery a wire 47 is led to the other pole 44, the coil of an electro-magnet 48 being included therein. This wire 47 is of any suitable diameter, and variable resistance R, of any of the well-known types, is preferably included in the circuit formed by said wire. The armature 49 of the magnet 48 is drawn off the poles of the latter by a spring 50 of a predetermined tension. To this armature is connected a wire leading to the pole 43 of the storage-battery, and from a fixed contact 52, with which the armature 49 makes engagement when lifted by the magnet, a wire leads to one terminal of the electro-magnet 24, and from the other terminal of the coil a wire is carried to the other pole 44 of the battery 40. This circuit will be more particularly described hereinafter. The purpose of this construction of parts and arrangements of circuits is to insure the opening of the primary or charging circuit should the variable power of the wind allow the dynamo to run down to so low a speed that the electro-motive force falls below that of the partly-charged battery and at the same time to complete a circuit for the dynamo in which the magnet 32 is included. It is also desirable that when the battery shall have become fully charged the dynamo may be cut out and at the same time its action be arrested temporarily. To effect the latter result I employ the electro-magnet 48, in the circuit of which resistances are inserted sufficient to render the magnet practically inert until the storage-battery has received a given charge, whereupon the armature 49 will lift, closing the circuit of the magnet 24 and attracting the armature 25 on the vane 21, deflecting the latter and throwing the wind-wheel into a position where the wind will have little power. This same result may be accomplished at any moment by closing the switch 55, which is of any ordinary form.

In place of the arrangement of circuits shown, I may employ that shown in Fig. 4. In this arrangement the primary or charging circuit is the same substantially as already described and shown in Fig. 1. In place, however, of the electro-magnet 48 and armature 49, placed in the secondary circuit formed by wire 47, I employ a circuit running as follows: From the pole 43 of the storage-battery 40 a wire 57 is led to the insulated end 58 of armature 35, to which it is permanently attached. From a fixed contact 59, arranged above and in position to have electrical contact with the end 58 when the armature is drawn up, a wire 60 is led to the other pole 44, a measuring-instrument 48ª, such as a voltmeter, being introduced in said circuit, whereby the tension of the charge in the battery may be indicated. The needle or index of the measuring-instrument is in electrical connection through its axis with the wire 62, leading to the electro-magnet 24, while a continuation of said wire 62 leads from a pin or other contact 61ª to the other pole 44 of the storage-battery. The wire 61 is led direct to the pole 43. When the index of the measuring-instrument reaches the predetermined point 61ª, the circuit of the electro-magnet 24 will be completed and the vane 21 will be deflected. It will be noted that this circuit is also closed by the switch 55, which is the same circuit as that shown in Fig. 1.

A series of resistances R may be inserted in the circuit of the voltmeter to compensate for its different action in different temperatures. I may also insert a resistance R in the charging-circuit to prevent the possibility of a sudden increase in the wind imparting such speed to the armature-shaft as to cause "injurious" results. I may insert a series of different resistances R in the circuit of the electro-magnet 48, as shown in Fig. 1, in order that the action of the magnet upon its armature 49 may be predetermined to take place when the charge in the storage-battery has reached a given tension.

As the apparatus may be used to charge batteries of various size and power, it is desirable to have some means whereby the action of the magnet 48 may be timed to take place at a suitable point in the process of charging the battery. I may therefore insert a greater or less number of the resistance-coils, or I may form each of the latter of a different resistance.

I may use in the circuit formed by wire 47 the automatic method of making and breaking the circuit of electro-magnet 24, embodied in the coil and core 32, and this may be substituted for the magnet 48 or of the instrument 48ª.

The apparatus may be placed upon a roof or on a natural elevation, where an exposure to air-currents is to be obtained, as well as upon the ordinary tower employed in mounting wind-wheels.

The circuit of the electro-magnet 24 is completed in Fig. 1 by two wires 61 and 62, leading from the coils of said magnet, the former to a bracket 63, mounted on the outer face of the socket-piece 4, and the latter wire to a similar bracket 64 on the opposite side of the socket. These brackets are insulated from the part to which they are attached and have rolling contacts 65 and 66, respectively, the former rolling upon an annulus 67 and the latter upon a similar annulus 68, both mounted on an insulating-piece 69 beneath the collar 3 on the tubular upright. To these annuli are connected continuations 61 and 62 of the wires connected to the brackets. The wire 61 is taken to the fixed contact 52, and thence from the armature 49 to the electrode 43 of the battery. The wire 62 leads from the other bracket directly to the electrode 44 of said battery.

To prevent the casing being blown off the pivotal bearing in very high gales, I attach to the socket-bearing 4 guards 71, formed of a suitable metal and having their free ends hooking under the edges of the annulus 67. These guards are made of any non-conducting material.

A door 72 is provided in the casing to give access to the interior.

In erecting the mechanism upon a tower of the kind used in windmills of various constructions I may terminate the tubular upright 1 between its ends—as, for example, at the point a, Fig. 1. In this case projections 73 would be cast upon or rigidly attached to the severed or upper portion of the tubular upright 1, at right angles therewith, as shown in Fig. 1. Upon the ends of these radial arms, which are of such size as to give suitable strength, are hinged plates 73ª, which are capable of being adjusted at any angle with the parts to which they are hinged.

The manner of attachment to the tower is as follows: The lower end of the upright 1 is introduced into an opening between posts, which may, as shown in Fig. 1, be inclined at a suitable angle, and the radial rigid arms are rested upon the tops of these posts, beveled for that purpose, while the hinged portions are laid upon the outer inclined faces of the posts and are bolted to the latter.

A pipe of any suitable material may be screwed or otherwise inserted in the lower end of the upright to carry the wires.

Inasmuch as it is necessary to avoid too high speed of the dynamo, it will be found that the adjustability of the directing-vane, or rather its elastic yield upon its hinges, will produce this regulating effect upon the speed admirably, this result being due to the change of position of the wheel caused by the change of direction in the air-currents. On the other hand, a very high speed can be attained, if desired, by attaching suitable gearing to the shaft.

This invention will be of high value in towns, both large and small, where regular plants are not to be found, as well as large cities, where the suburbs are not easily reached. It can be used with perfect success in all cases and with a nominal expense, as the motive power is without cost and the initial expense is comparatively small. The currents generated at different times and in different qualities, owing to the variable force of the wind, are safely stored up in the secondary batteries and thence may be used as they are required for every purpose to which the electric current can be applied.

For interior and exterior lighting and the propulsion of the lighter machinery, this apparatus will be found highly useful and practical by reason of its simplicity and the extremely low expense at which each individual apparatus may be maintained.

The switch 55 is generally used when it is necessary to oil the bearings or make repairs, at which times whatever energy is found in the storage-battery may be used for this purpose by simply throwing the switch on its contact.

One great advantage of the combination shown, by which the bearings of the operative parts are located in the pivoted casing, is that it enables me to greatly diminish the friction which would be produced in the ordinary construction of windmills, in which these parts are located at the bottom of the upright, or at such point that the power of the wind-wheel must be transmitted throughout the length of the upright and geared to the dynamo.

A suitable form of governor may be used to render the generated current uniform, although devices of this type can only be employed during periods when a steady breeze of substantially uniform force is blowing.

The casing 6 may be ventilated by any known or preferred means, if desired.

What I claim is—

1. In an apparatus for generating electricity, the combination, with a wind-wheel, of a shaft journaled in a drum or casing, an armature mounted on said shaft, a field-magnet arranged in said drum, a pivotal support for said drum, conductors arranged upon said support and contacting with conducting devices on the bearing for said pivotal support, a working circuit for the dynamo, a derived circuit for said dynamo, and an automatic device closing the working circuit when the dynamo generates a current of predetermined strength and breaking said circuit and making the derived circuit when the current falls below a given point, substantially as described.

2. In a mechanism for generating electric currents, the combination, with a dynamo, of a wind-wheel upon the shaft on which the armature is mounted, a pivoted support for said parts, conductors connecting the poles of the dynamo to the poles of a storage-battery, devices intermediate between the movable and the rigid members for the dynamo, and automatic means for closing the charging-circuit and simultaneously breaking the derived circuit, and vice versa, substantially as described.

3. In a mechanism for generating electric currents, the combination, with a dynamo inclosed within a casing, a shaft journaled in said casing, a wind-wheel on the shaft, a directing-vane hinged or pivoted on the casing and centered by opposite springs, an electro-magnet mounted on said casing and when energized attracting an armature on the vane, a circuit for the dynamo connected with a secondary battery charged by the generated current, a derived circuit for the electro-magnet attracting the vane, an automatic device for making and breaking the charging-circuit and the derived circuit for the dynamo, respectively, and an automatic circuit-closer for the secondary circuit of the electro-magnet, substantially as described.

4. In a mechanism for generating electric currents, the combination, with a dynamo arranged in a casing pivoted upon a tubular support, of a shaft having a wind-wheel driving the armature of said dynamo, a pivotally-mounted directing-vane, springs centering the said vane, an electro-magnet attracting an armature on one side thereof, a working circuit for the dynamo, in which are interposed brackets mounted on the pivoted part of the support and having rolling contacts on annular conductors on the fixed part of said support, a storage-battery charged by the working circuit, a derived circuit for the dynamo, an electro-magnet and armature forming part of the working circuit and derived circuit for the dynamo, a secondary circuit for the electro-magnet attracting the vane, and a second electro-magnet interposed in a separate secondary circuit, the armature of which magnet opens and closes the circuit of the electro-magnet attracting the armature on the vane, substantially as described.

5. In an apparatus for generating electric currents, the combination, with a dynamo arranged in a pivotally-supported casing, of a shaft carrying the armature of the dynamo, a wind-wheel driving the said shaft, a pivoted directing-vane on the casing, springs centering the same, an electro-magnet attracting an armature on the vane when said magnet is energized to swing it to one side, a secondary or storage battery, a charging-circuit for said battery, a battery-circuit for the electro-magnet actuating the vane, an electro-magnet interposed in the charging-circuit, an armature for said magnet having an insulated portion forming part of the charging-circuit and a second insulated portion forming part of a separate circuit for the dynamo, and contacts, one in the charging-circuit and one in the separate circuit, with which the said insulated parts of the armature are alternately in contact, substantially as described.

6. In an apparatus for generating electric currents and charging storage-batteries, the combination, with a dynamo arranged on a pivotal support, of a shaft carrying the armature of a dynamo, a wind-wheel driving said shaft, a pivoted spring-centered vane on the dynamo-support, an electro-magnet mounted on the support and attracting an armature on the vane when energized to swing it to one side, a storage-battery, a charging-circuit for said battery, a circuit for the electro-magnet attracting the vane, and a measuring-instrument interposed in the circuit and provided with a contact traveling with the index and a contact fixed upon the dial, by which the circuit is completed and the vane swung when the battery is charged to a suitable tension, substantially as described.

7. The combination, with the rigid and movable parts of the wind-wheel support, of a guard-casing rigidly mounted on the movable part or member and having a flange hooking under a flange or collar on the rigid member, the electrical connections being arranged within and covered and protected by said guard, substantially as described.

In testimony whereof I have hereunto set my hand and affixed my seal in presence of two subscribing witnesses.

JAMES MADISON MITCHELL. [L. S.]

Witnesses:
JAMES L. NORRIS,
JAMES A. RUTHERFORD.